March 1, 1938. D. TAFT 2,109,786
METHOD OF AND APPARATUS FOR OPERATING A CUTTING TOOL
Filed Jan. 13, 1936
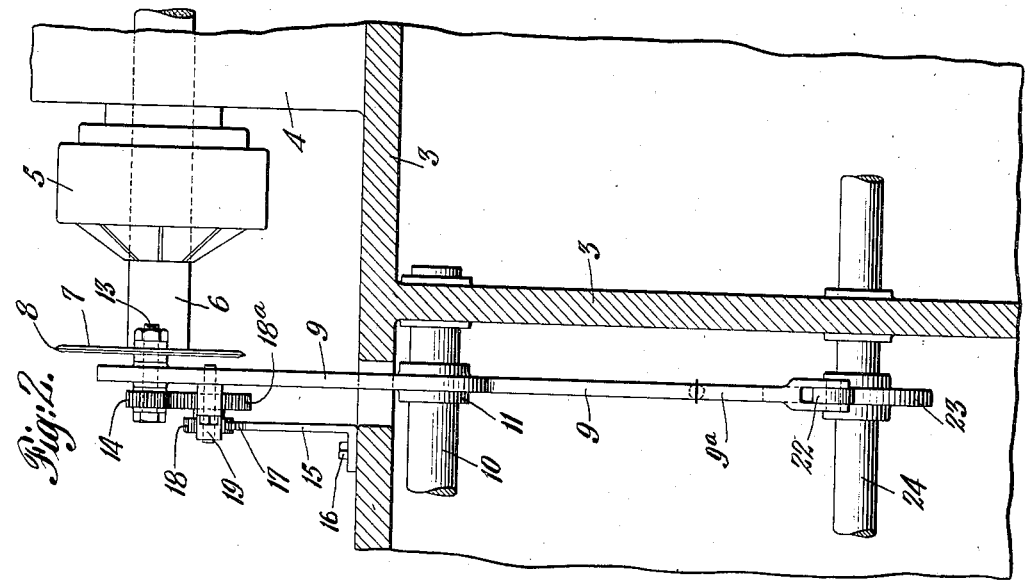
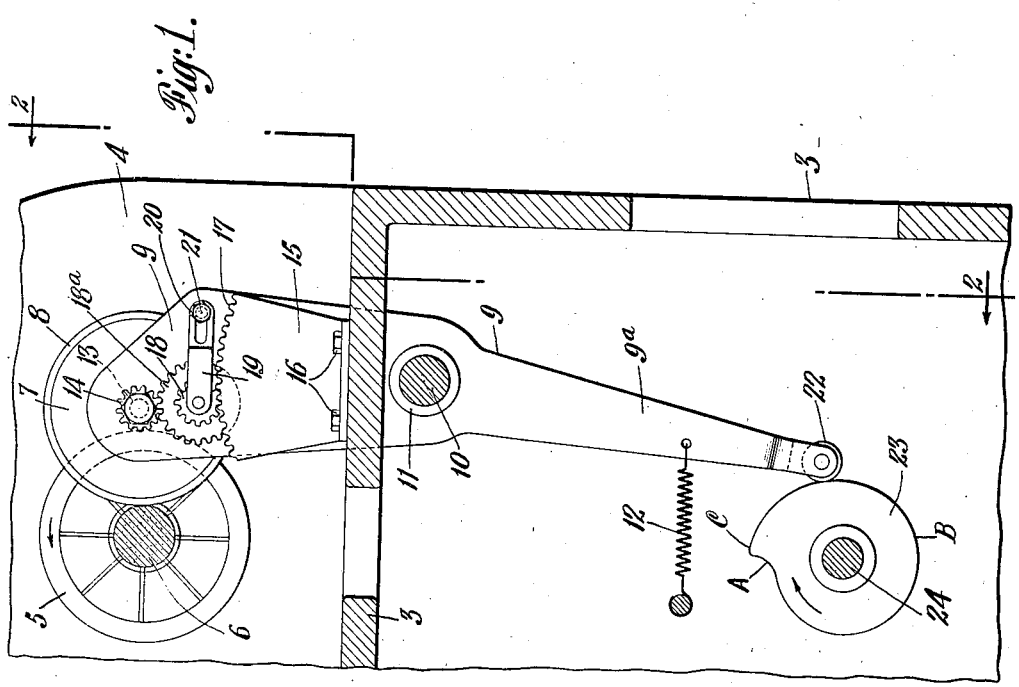
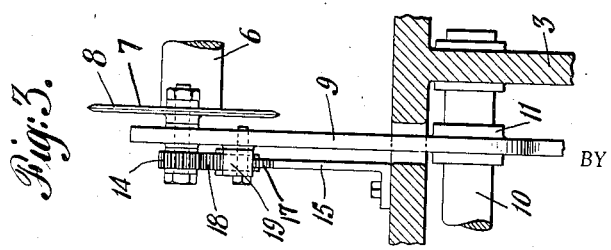
INVENTOR.
DARWIN TAFT
BY Maxwell Barus
ATTORNEY.

Patented Mar. 1, 1938

2,109,786

UNITED STATES PATENT OFFICE 2,109,786

METHOD OF AND APPARATUS FOR OPERATING A CUTTING TOOL

Darwin Taft, Bainbridge, N. Y., assignor to American Plastics Corporation, a corporation of New York Application January 13, 1936, Serial No. 58,834

19 Claims. (Cl. 164—60)

This invention relates to a method and apparatus for operating a rotatable cutter at variable speeds and is more particularly concerned with the use of such a cutter in connection with a lathe or other turning apparatus used in the art of machining plastic and semi-plastic materials.

In the machining of relatively soft materials such as casein rods or rods of similar plastic materials which are held by a rotating chuck, much difficulty has been experienced heretofore in using cutters of the rotary type. Such cutters have been positively rotated at a substantially constant speed and when operated in this manner develop considerable friction with attendant heat, tending to bind and tear the material rather than to effect a clean cut. On the other hand, freely rotatable cutters frictionally contact the outer edges of a partially cut rod and the turnings, and are thus frequently rotated too fast as they approach the center of the rod. This condition similarly heats the material, causing softening thereof with the result of binding, sticking, and the production of a rough cut.

One object of my invention is to overcome these difficulties and to provide a method of and apparatus for positively driving a rotatable cutter in which the speed of rotation of the tool may be accelerated and/or decelerated in any desirable manner as it makes each cut. I have found that a rotatable disc either of the knife edge or fine tooth saw edge type gives very satisfactory results in cutting off a rotating rod of casein if the peripheral speed of the tool is gradually decreased during the cutting operation.

Another object of my invention is to provide simple, compact, and easily operated apparatus for positively driving a rotatable cutter at a speed regulated in accordance with the position of the cutting disc and/or the speed of the material to be cut.

Further objects and advantages of my invention will be more apparent from a detailed description of one embodiment thereof illustrated in the drawing, in which:

Figure 1 is a vertical cross section through a lathe and showing one form of my improved cutter in the position occupied at the beginning of a cutting operation.

Figure 2 is a side elevation of the apparatus shown in Fig. 1 and taken on the line 2, 2 thereof.

Figure 3 illustrates a modified gear arrangement for rotating the cutting tool.

In the drawing, numeral 3 indicates a portion of a frame or other mounting having an upwardly extending portion 4 for supporting a rotatable chuck 5 of any suitable construction. A rod of casein or similar material 6 may be held in said chuck and either supported at its other end by a similar chuck or allowed to rotate freely as illustrated. Chuck 5 is preferably rotated at a substantially constant speed and various tools may be employed in the usual manner to shape the rod as desired.

In forming articles such as buttons or the like from casein rods, it is customary to shape the end of the rod and then cut off the shaped section. This operation is repeated along the length of the rod until the material is used up. As each article is cut off the rod may be advanced longitudinally through the chuck 5 thus bringing a fresh uncut portion under the action of the tools.

In the embodiment of my invention illustrated in the drawing a rotatable cutter 7, preferably having a knife edge 8, is mounted upon one end of the tool arm 9. Collar 11, which may be integral with arm 9, surrounds the shaft 10 and allows the arm to pivot freely about said shaft. Shaft 10 may be fixed to the frame 3 or mounted in any other desirable manner. The lower section 9a of arm 9 is preferably constantly urged to one side by a spring 12, thus normally tending to move the cutting wheel 8 into a position removed from the rod of material 6. The cutter 7 is preferably fixed to a shaft 13 which is passed through the arm 9 and carries a fixed pinion gear 14 at its other end. Any suitable means may be used to fix these members to the shaft 13 which is itself free to rotate in its mounting in the arm 9. A segment gear or rack 15 may be fixed to the frame by the bolts 16 and provides a section of gear teeth 17 below the pinion 14. These gear teeth 17 are preferably arranged in an arc about the center of the shaft 10. Rotatably mounted on one end of the bracket 19 are the gears 18 and 18a, the former meshing with the teeth 17 of the segment 15 and the latter with the pinion 14. These gears are fixed to a common stub shaft or mounted in some other manner for simultaneous rotation. This bracket 19 may be provided at its other end with an elongated slot 20, and a bolt 21 may be passed through this slot and the tool arm 9 to removably clamp the bracket 19 to said arm in any desired position. The lower end 9a of the tool arm 9 is preferably bifurcated and carries a small roller follower 22 which is freely rotatable and held against the surface of cam 23 by the action of the spring 12. Cam 23 is arranged for rotation with the shaft 24 which may be driven in accordance with the speed of the chuck 5 and the rod 9 by any suitable means (not shown).

The operation of the device will be as follows: As the cam 23 rotates in a clockwise direction (Fig. 1), the lower end 9a of the tool arm 9 will be moved to the right, thus moving the upper end of the arm 9 to the left. The pinions 14, 18 and 18a carried by this upper end of arm 9 will also be moved to the left and as the pinion 18 is in engagement with the fixedly mounted teeth 17, this pinion will be positively rotated in a counter clockwise direction which will likewise rotate gear 18a. Pinion 14 meshing with pinion 18a will accordingly rotate the cutter 7 in a clockwise direction in accordance with the speed of movement of the upper end of the arm 9. The movement of the arm 9 will thus be effected in accordance with the shape of the cam 23. By suitably designing cam 23, the speed of movement of the tool arm 9 may be easily adjusted for any portion of its travel in accordance with the position of the cutter with respect to the rod 6.

I prefer to employ a cam which is designed to advance to tool 7 towards rod 6 at a gradually decreasing speed. When the cam surface designated as A is contacting the roller 22, the tool 7 would be in its retracted position. As the cam rotates to bring the surface B in contact with the follower, the tool is retained in this position a sufficient time for the other tools to perform the desired shaping and turning operations. The cam surface AB is therefore arcuate and may be of a suitable length to correspond to the number of shaping tools used and their time of operation. The shaped article is now ready to be cut from the end of the rod, and as the cam rotates to bring the surface BC against follower 22, the upper end of the tool arm 9 moves towards the left with an attendant rotation of the tool 7. By suitably designing the cam surface section BC the speed of forward movement and the rotation of the tool may be gradually decreased as the edge of the tool approaches the center of rod 6.

It is desirable in some cases to have the rotational speed of the tool such that the peripheral speed of the tool is always substantially the same as the lineal speed of the material being cut. In such a case the speed of the cutting edge will be uniformly decreased as the tool cuts into the rod and will stop as the tool reaches the center of the rod. This will effect a purely cutting action without any tendency to saw the material. With other types of rods, however, some sawing action is desirable and the tool speed should not then be equal to the speed of the rod. In most operations on plastic materials, such as casein, it is preferred to gradually or uniformly, and positively decrease the peripheral speed of the tool as the cutting edge bites deeper into the rod, whether a purely cutting action, a sawing action, or a combination of both is desired.

As the surface C of the cam passes the roller 22 and the surface A approaches this follower, the tool is rapidly withdrawn from the rod and quickly moves back into its retracted position, ready to begin the next cycle.

The positive rotation of the tool 7 and the positive deceleration of the tool speed during the cutting operation is preferred, but the apparatus may be modified, if desired, by driving the tool 7 through any suitable ratchet and pawl or clutch mechanism to effect a positive drive in only one direction. For example a ratchet may be fixed to the cutting disc 7, and a pawl engaging such ratchet may be fixed to shaft 13. Thus if the disc 7 is otherwise free to rotate about shaft 13, a positive drive of the tool may be effected in only one direction.

Any other variation in the peripheral speed of the cutter 7 may be employed by suitably varying the design of cam 23, although I prefer to have this cam designed so that the cutter speed bears a ratio to the lineal speed of the rotating rod 6 at the point of the cut, which will produce a smooth and clean cut surface.

My device has the advantage that it provides a positively driven rotatable cutter which may be rotated by a direct connection to the means for rotating the rod of material to be cut. Thus, if the lathe should be stopped the cutting disc cannot possibly be rotated. On the other hand, if the speed of the lathe should vary, the speed of the rotating cutting disc will be varied accordingly.

If desired my improved cutting mechanism may be designed so that it is shiftable longitudinally of the rod to make cuts at different points. This may be easily effected by employing a movable support for the gear segment 15, providing a collar 11 which will slide on the shaft 10, and suitably keying the cam 23 to the shaft 24 so that it may be slid along the shaft 24 in accordance with the movement of the gear segment support and the arm 9.

By the use of the intermediate pinions 18 and 18a with their supporting bracket 19, I have provided an effective and simple manner for changing and varying the speed of rotation of the cutter 7 without changing the cam 23. In the device illustrated in Figs. 1 and 2, the gear ratio may be varied by changing any one of the gears 14, 18, or 18a and adjusting the position of the bracket 19. If, for example, a larger gear is to be substituted for the gear 18a, the bracket 19 is removed and the substitution effected. When the bracket is replaced, it may be adjusted at any suitable angle or distance from the bolt 21 by means of the slot 20, so that the new gear 18a meshes with pinion 14, and the pinion 18 meshes with the teeth 17.

With the modified arrangement illustrated in Fig. 3, the gear 18a is omitted and pinion 18 meshes directly with both pinion 14 and rack 15, thus providing a more compact driving unit. This construction however, has the disadvantage that it is necessary to change the size of both gears 14 and 18 in order to change the gear ratio and vary the speed of the tool in this manner. If flexibility of the apparatus is not a consideration, however, the pinion 14 may even be meshed directly with teeth 17 of the rack.

Various other modifications may be made in the particular apparatus embodying my invention. The tool arm 9 may be fixed to shaft 10 and the shaft pivotally supported at its ends in suitable bearings. It is also within the scope of my invention to substitute variously shaped tools for the simple cutting disc illustrated.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. The method of cutting a rotating rod of plastic material comprising applying a cutting edge thereto, and positively moving said cutting edge into contact with said material at a uniformly decreasing speed.

2. The method of cutting a rotating rod of casein comprising applying a cutting edge thereto, and positively moving said cutting edge in the same direction and at a gradually decreasing speed.

3. A process of cutting a rod of casein-like material comprising rotating said rod, moving a rotary cutting tool towards the center of said rod, and positively rotating said tool at such a rate of speed that the peripheral speed of said tool is substantially equal to the lineal speed of the material being cut throughout the duration of the cutting operation.

4. A process of cutting a rod of casein-like material comprising rotating said rod, moving a rotary cutting tool towards the center of said rod, positively rotating said tool at a peripheral speed substantially equal to the peripheral speed of said rod, and decreasing the peripheral speed of said tool as it approaches the center of the rod.

5. A process of cutting a rod of casein-like material comprising rotating said rod, moving a rotary cutting tool towards the center of said rod, positively rotating said tool at a peripheral speed substantially equal to the peripheral speed of said rod, and uniformly decreasing the peripheral speed of said tool as it approaches the center of the rod in accordance with the rate at which said tool approaches said center.

6. In apparatus of the character described, a rotary cutting tool, and means for moving said tool radially and for positively rotating the tool at a varying speed simultaneously with said movement.

7. In apparatus of the character described, a rotary cutting tool adapted to be moved radially, and means for rotating said tool in accordance with the rate of radial movement.

8. In apparatus of the character described, a rotary cutting tool, means supporting said tool for radial movement, and means for moving said support and causing simultaneous rotation of said tool.

9. In apparatus of the character described, a rotary cutting tool, means supporting said tool for radial movement, means for moving said support, and means for rotating said tool in accordance with the movement of said support.

10. In apparatus of the character described, a rotary cutting tool, means for supporting said tool for radial movement, cam means for moving said support, and means for rotating said tool in accordance with the movement of said support.

11. In apparatus of the character described, a rotary cutting tool, means for supporting said tool for radial movement, means for moving said support, means for rotating said tool including a plurality of gears, and means for varying the gear ratio by changing one of said gears.

12. In apparatus of the character described, a rotary cutting tool, means for supporting said tool for radial movement, means for moving said support, a fixed gear segment, and means in contact with said segment for rotating said tool as said support is moved.

13. In a lathe, means for rotating a rod of material to be turned, a cutting tool, means for moving the tool towards the rod, and means for positively moving the cutting edge of said tool into engagement with the rod at a speed which is gradually decreased as the tool approaches the center of the rod.

14. In a lathe, means for rotating a rod of material to be turned, a rotary cutting tool mounted for radial movement, and means for moving said tool into engagement with said rod and simultaneously positively rotating the rod at a peripheral speed substantially equal to the lineal speed of the material to be cut.

15. In a lathe, means for rotating a rod of material to be turned, a rotary cutting tool mounted for radial movement, means operatively connected to said first named means for moving said tool radially, and means for rotating the tool in accordance with the rate of radial movement.

16. In a lathe, means for rotating a rod of material to be turned, a rotary cutting tool mounted for radial movement, cam means connected to said first named means for effecting radial movement of the tool, fixed gear means, and means connected to said gear means for rotating said tool.

17. Apparatus of the character described comprising, a rotatable cutting tool, a movable support arranged to effect movement of said tool towards a work piece, a fixed rack, gear means carried by said support and engaging said rack, a plurality of gear means connected to said first mentioned gear means for rotating said tool, and means for moving said support.

18. A method of cutting a rotating rod of plastic material comprising bringing a rotary cutter and said rod into cutting engagement, and positively rotating said cutter at a gradually decreasing speed as the cutter effects its cutting action.

19. Apparatus of the character described comprising means for rotating a rod of material, a rotary cutter, means for bringing said rod and cutter into cutting engagement, and actuating means responsive to said second named means for positively rotating said cutter at a speed determined by the relative positions of said rod and cutter.

DARWIN TAFT.